US012617899B2

(12) United States Patent
Kim et al.

(10) Patent No.: US 12,617,899 B2
(45) Date of Patent: May 5, 2026

(54) ELECTRICALLY CONDUCTIVE ELASTOMER AND METHOD OF SYNTHESIZING THE SAME

(71) Applicant: KOREA INSTITUTE OF SCIENCE AND TECHNOLOGY, Seoul (KR)

(72) Inventors: Sang Woo Kim, Seoul (KR); Jun Ho Lim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 704 days.

(21) Appl. No.: 18/051,729

(22) Filed: Nov. 1, 2022

(65) Prior Publication Data

US 2023/0192959 A1 Jun. 22, 2023

(30) Foreign Application Priority Data

Dec. 21, 2021 (KR) ........................ 10-2021-0183912

(51) Int. Cl.
| | |
|---|---|
| *C08G 75/24* | (2006.01) |
| *C08J 3/24* | (2006.01) |
| *C08K 5/17* | (2006.01) |
| *C08L 81/08* | (2006.01) |

(52) U.S. Cl.
CPC ................ *C08G 75/24* (2013.01); *C08J 3/24* (2013.01); *C08K 5/17* (2013.01); *C08L 81/08* (2013.01); *C08J 2381/08* (2013.01); *C08K 2201/001* (2013.01)

(58) Field of Classification Search
CPC ......... C08G 75/24; C08J 3/24; C08J 2381/08; C08K 5/17; C08K 2201/001; C08L 81/08
See application file for complete search history.

(56) References Cited

U.S. PATENT DOCUMENTS

2011/0049435 A1* 3/2011 Wakizaka ............... G02B 1/111
428/323

FOREIGN PATENT DOCUMENTS

CN 110922810 A 3/2020

OTHER PUBLICATIONS

Yeasmin Nahar et al., "Greener, Faster, Stronger: The Benefits of Deep Eutectic Solvents in Polymer and Materials Science," Polymers 2021, Jan. 30, 2021.
Ningxuan Wen et al., "Highly conductive, ultra-flexible and continuously processable PEDOT:PSS fibers with high thermoelectric properties for wearable energy harvesting," Nano Energy 78 (2020), Sep. 14, 2020.

* cited by examiner

*Primary Examiner* — Shane Fang

(57) ABSTRACT

Provided is an electrically conductive elastomer with high stretchability and high durability. A method of synthesizing an electrically conductive elastomer includes (a) preparing a eutectic solvent by mixing quaternary ammonium salt and organic acid, and (b) adding and blending the eutectic solvent with poly(3,4-ethylenedioxythiophene) polystyrene sulfonate (PEDOT:PSS), a photocuring agent, and a crosslinker and performing photopolymerization.

10 Claims, 15 Drawing Sheets

ChCl-AA          ChCl-AA-PEDOT:PSS          ChCl-AA-PEDOT:PSS

UV curing

● ChCl          ▬ PEDOT          ⋀⋁⋀ Cross linker

● AA          ⋀⋀⋀⋀ PSS

PSS-rich domain

H₂SO₄ treatment

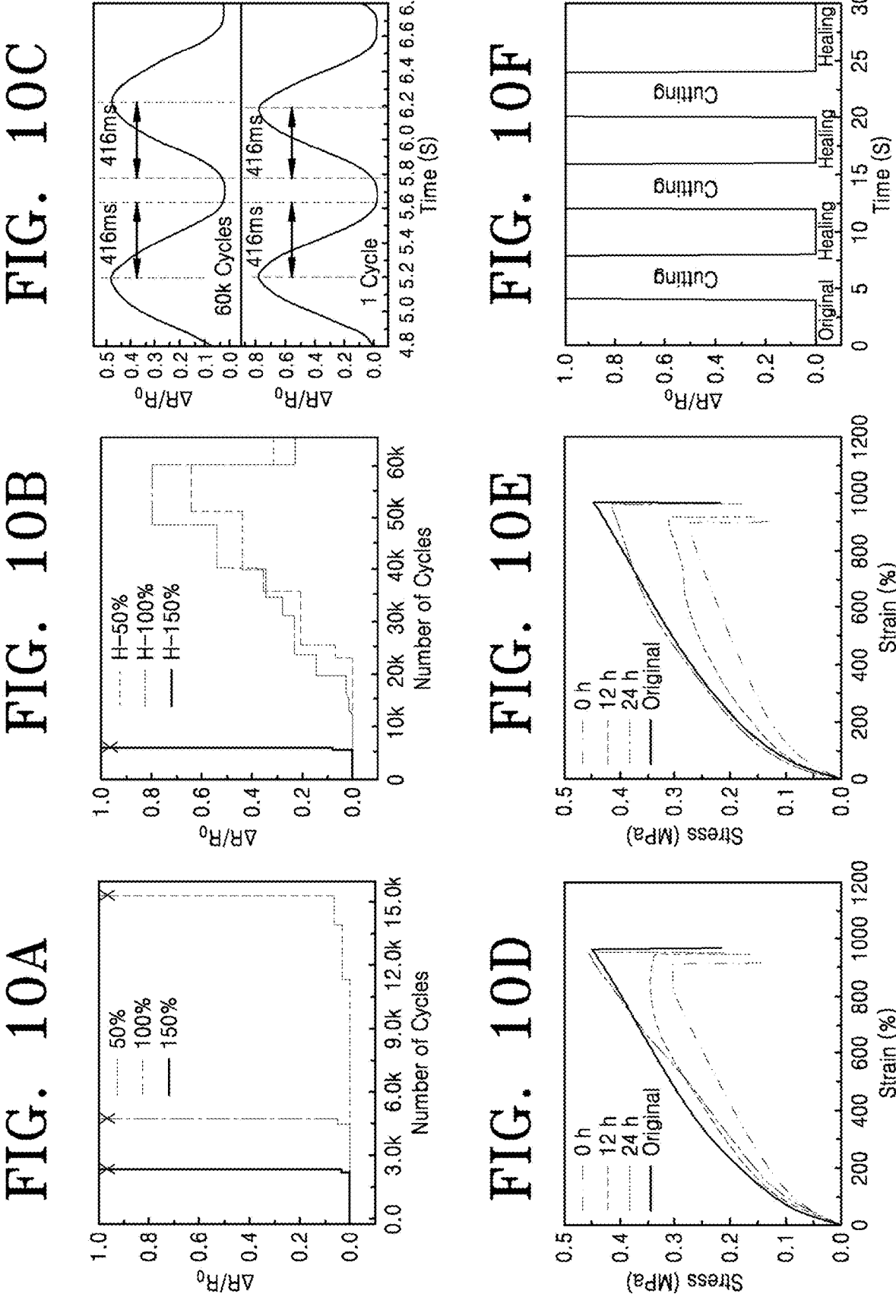

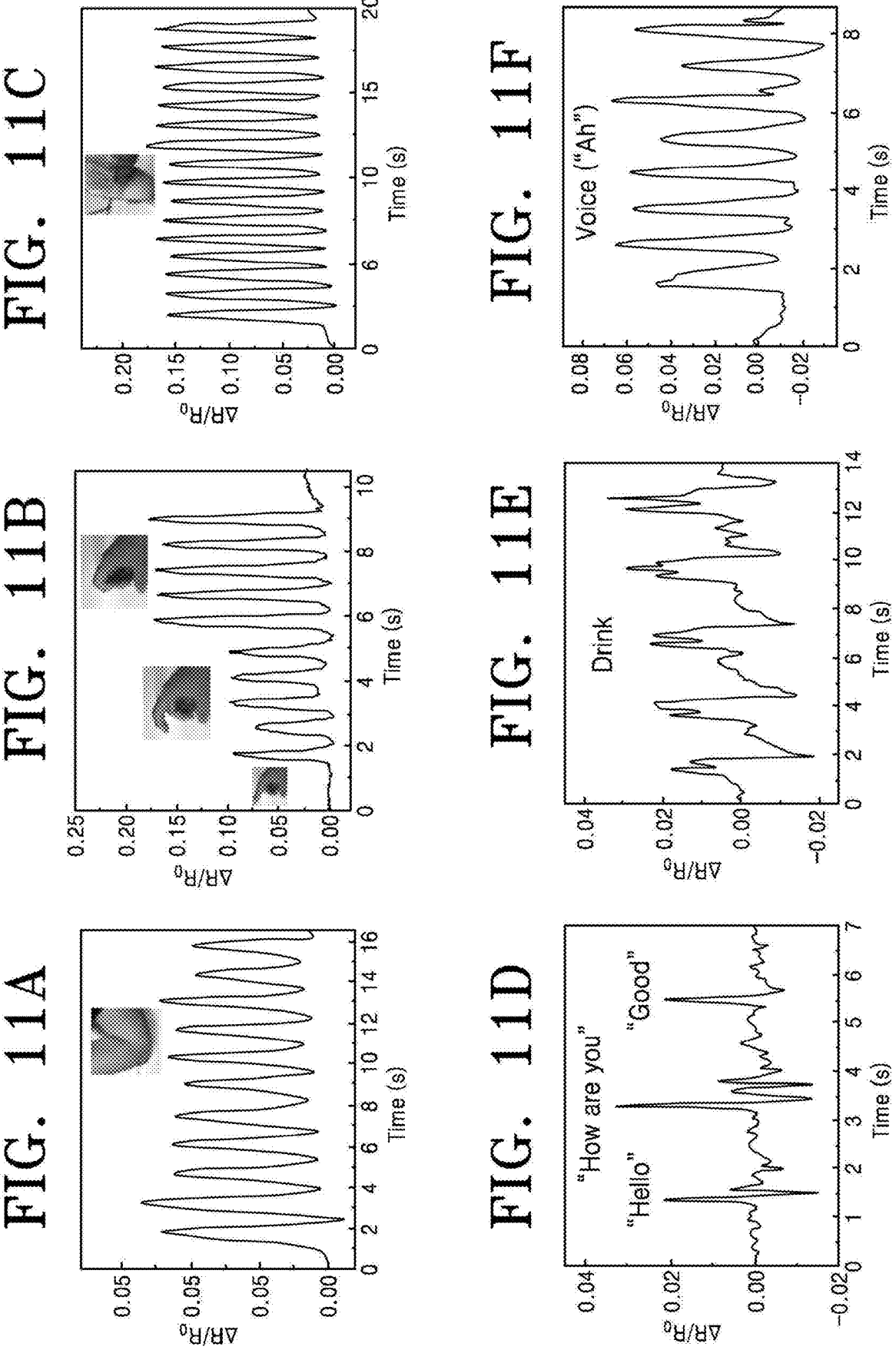

ELECTRICALLY CONDUCTIVE ELASTOMER AND METHOD OF SYNTHESIZING THE SAME

CROSS-REFERENCE TO RELATED PATENT APPLICATION

This application claims the benefit of Korean Patent Application No. 10-2021-0183912, filed on Dec. 21, 2021, in the Korean Intellectual Property Office, the disclosure of which is incorporated herein in its entirety by reference.

BACKGROUND OF THE INVENTION

1. Field of the Invention

The present invention relates to an electrically conductive elastomer and, more particularly, to a high-durability conductive elastomer synthesized by adding a poly(3,4-ethylenedioxythiophene) polystyrene sulfonate (PEDOT:PSS) conductive polymer to an ionic eutectic solvent, and a biosensor manufactured using the conductive elastomer.

2. Description of the Related Art

Currently, a technology for manufacturing light-weighted, flexible, and wearable devices by using a stretchable material that does not cause degradation of electromechanical performance of a system under deformation similar to that of human skin is being highly developed. In addition, research is being actively conducted on flexible body-attachable electronic skin technology that mimics various functions of human skin. To manufacture such devices with flexibility, materials having high mechanical stretchability and high conductivity are required. As the above-described materials, hydrogels and conductive elastomers stand out. The hydrogel-based materials have a self-healing function and a high transmittance. However, the function is lost when water evaporates in a dry environment. In contrast, the conductive elastomers are being commonly used in various industrial fields due to their high electrical conductivity, processability, flexibility, and easy synthesizability. With the current increase in demand for wearable devices such as stretchable organic light-emitting diodes (OLEDs), flexible organic photovoltaics, and patch-type electronic skins, high-stretchability and high-durability electrically conductive materials capable of transmitting signals and having flexibility so as not to be damaged by body motions are being increasingly demanded.

SUMMARY OF THE INVENTION

The present invention provides an electrically conductive elastomer with high stretchability and high durability. However, the scope of the present invention is not limited thereto.

According to an aspect of the present invention, there is provided a method of synthesizing an electrically conductive elastomer, the method including (a) preparing a eutectic solvent by mixing and causing reaction between quaternary ammonium salt and organic acid, and (b) adding and blending the eutectic solvent with poly(3,4-ethylenedioxythiophene) polystyrene sulfonate (PEDOT:PSS), a photocuring agent, and a crosslinker and then performing photopolymerization.

The method may further include performing sulfuric acid treatment on the elastomer synthesized in step (b).

The quaternary ammonium salt and the organic acid may be mixed in a molar ratio of 1:1 to 1:3.

The method may further include adding 0.5 mol % to 2 mol % of phytic acid with respect to the organic acid.

The quaternary ammonium salt may include choline chloride, tetramethylammonium, acetylcholine, benzalkonium chloride, or cetrimonium chloride.

The organic acid may include any one selected from the group consisting of urea, thiourea, 1-methyl urea, 1,3-dimethyl urea, 1,1-dimethyl urea, acetamide, benzamide, ethylene glycol, glycerol, adipic acid, acrylic acid, benzoic acid, citric acid, malonic acid, oxalic acid, phenylacetic acid, phenylpropionic acid, succinic acid, lactic acid, and tricarboxylic acid.

A content of PEDOT:PSS may range from 0.5 wt % to 10 wt % with respect to a total mass of PEDOT:PSS and the eutectic solvent in step (b).

The photocuring agent and the crosslinker may be blended in a molar ratio of 0.1 to 0.3 of the organic acid in step (b).

According to another aspect of the present invention, there is provided an electrically conductive elastomer in which poly(3,4-ethylenedioxythiophene) polystyrene sulfonate (PEDOT:PSS) nanoparticles are dispersed in an ionic conductor matrix formed from a eutectic solvent prepared by causing reaction between quaternary ammonium salt and organic acid, wherein PEDOT:PSS includes a linear quinoid structure from which some of PSS is removed.

The ionic conductor may be formed from a eutectic solvent prepared by mixing choline chloride and acrylic acid.

According to another aspect of the present invention, there is provided a biosensor including the above-described electrically conductive elastomer.

BRIEF DESCRIPTION OF THE DRAWINGS

The above and other features and advantages of the present invention will become more apparent by describing in detail embodiments thereof with reference to the attached drawings in which:

FIG. 10A, FIG. 10B, FIG. 10C, FIG. 10D, FIG. 10E, and FIG. 10F are graphs showing a 60k repeated-fatigue test of embodiments of the present invention, and response times before and after the test;

FIG. 11A, FIG. 11B, FIG. 11C, FIG. 11D, FIG. 11E, and FIG. 11F show results of detecting signals corresponding to physiological body motions by a biosensor manufactured using an elastomer according to an embodiment of the present invention;

DETAILED DESCRIPTION OF THE INVENTION

Figure 1A:
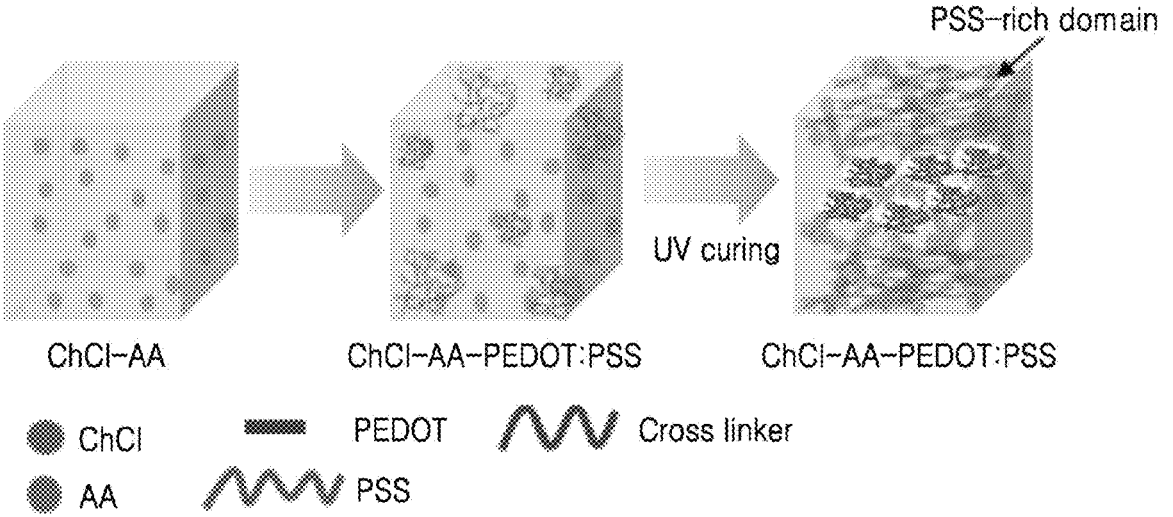
FIG. 1A and FIG. 1B are conceptual views showing reactions for synthesizing an electrically conductive elastomer according to an embodiment of the present invention.

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. Like reference numerals denote like elements throughout. Various elements and regions are schematically illustrated in the drawings. Therefore, the scope of the present invention is not limited by the sizes or distances shown in the attached drawings.

According to the present invention, an elastomer is synthesized by preparing a eutectic solvent by mixing and causing reaction between quaternary ammonium salt and organic acid, and blending the eutectic solvent with a poly(3,4-ethylenedioxythiophene) polystyrene sulfonate (PEDOT:PSS) conductive polymer and then performing photopolymerization. For photopolymerization, a photocuring agent and a crosslinker are added to the eutectic solvent. The conductive elastomer synthesized as described above has a structure in which PEDOT:PSS polymer conductor nanoparticles are uniformly dispersed in an ionic conductor matrix formed from the eutectic solvent. When the elastomer is treated with sulfuric acid or organic acid, some of PSS chains surrounding PEDOT in PEDOT:PSS and having electrical insulation properties are removed to transform PEDOT:PSS from a coil-shaped benzoid structure to a linear quinoid structure. Therefore, the electrically conductive elastomer ultimately has a structure in which the PEDOT:PSS nanoparticles having a high electrical conductivity and a linear quinoid structure are uniformly dispersed in the ionic conductor matrix. In this case, due to the removal of some PSS, PEDOT:PSS is in a PEDOT-rich state.

A method of synthesizing an electrically conductive elastomer by using choline chloride as quaternary ammonium salt, and acrylic acid as organic acid will now be described as an example.

Figure 1B:
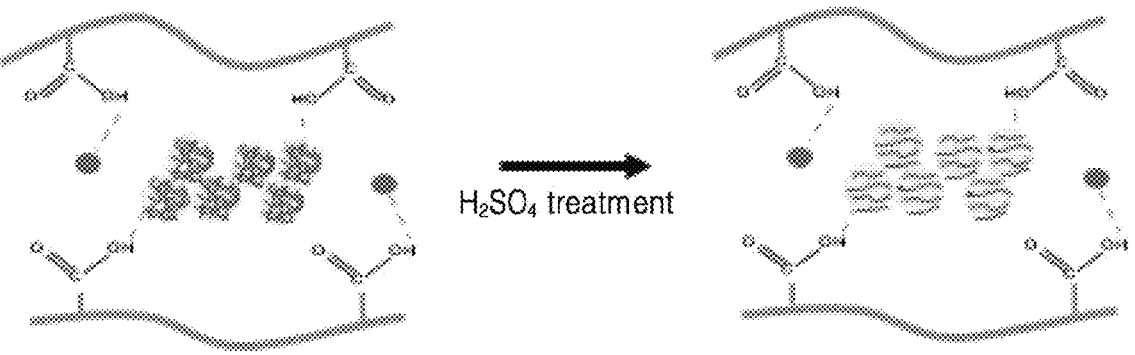

FIG. 1A and FIG. 1B are conceptual views showing reactions for synthesizing an electrically conductive elastomer according to an embodiment of the present invention. Referring to FIG. 1A, choline chloride (ChCl) and acrylic acid (AA) are mixed to prepare an ionic ChCl-AA eutectic solvent.

Then, a conductive polymer such as PEDOT:PSS ink is added to the prepared ionic eutectic solvent. Together with the PEDOT:PSS ink, a photocuring agent and a crosslinker are added for photopolymerization. The photocuring agent may include, for example, an ultraviolet (UV) curing agent. The mixed solution is inserted into a mold and irradiated with light (e.g., UV) to perform photopolymerization. The mold may be made of polyethylene, polypropylene, silicone, or Teflon. When photopolymerization is completed, an electrically conductive elastomer, which is a mixed conductor including PEDOT:PSS, is synthesized. This elastomer is referred to as ChCl-AA-PEDOT:PSS. The ChCl-AA-PEDOT:PSS elastomer has a structure in which PEDOT:PSS nanoparticles are uniformly dispersed in an ionic conductor matrix formed from the ChCl-AA eutectic solvent.

FIG. 1B shows acid treatment for increasing electrical conductivity of ChCl-AA-PEDOT:PSS. The synthesized ChCl-AA-PEDOT:PSS conductive elastomer is dipped in sulfuric acid ($H_2SO_4$) for a certain time. In this case, some of PSS chains having electrical insulation properties in ChCl-AA-PEDOT:PSS are removed to transform PEDOT:PSS from a coil-shaped benzoid structure to a linear quinoid structure. This elastomer is referred to as H-ChCl-AA-PEDOT:PSS. The electrical conductivity of the H-ChCl-AA-PEDOT:PSS elastomer is increased due to the linear quinoid structure of PEDOT:PSS.

Embodiments of the present invention will now be described. However, the following embodiments are merely for better understanding of the present invention, and the scope of the present invention is not limited thereto.

Embodiments

Figure 4A:
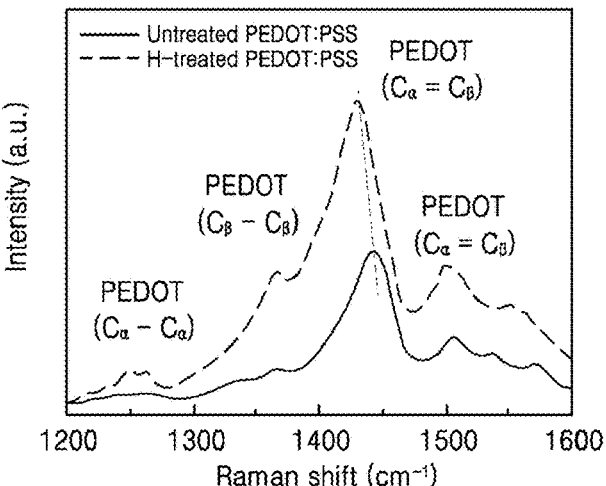
FIG. 4A, FIG. 4B, and FIG. 4C show Raman analysis results of embodiments of the present invention.

Table 1 shows conditions for synthesizing ChCl-AA-PEDOT:PSS elastomer samples. Referring to Table 1, to synthesize the samples, a ChCl-AA eutectic solvent was prepared by mixing choline chloride and acrylic acid at a molar ratio of 1:2 and causing reaction therebetween at 90° C. for 4 hours, and then was maintained at room temperature for a certain time. The prepared eutectic solvent was added with a UV curing agent (Irgacure 2959) and a crosslinker and then irradiated with light at a wavelength of 395/405 nm for 30 minutes to form a photopolymer. The ChCl-AA eutectic solvent corresponds to Comparative Example. A PEDOT:PSS conductive polymer was added to the prepared ChCl-AA eutectic solvent by 1.4 wt %, 2.76 wt %, 4.08 wt %, 5.37 wt %, and 6.62 wt % and then uniformly dispersed through sonication. The PEDOT:PSS-dispersed eutectic solvent was added with a crosslinker and a UV curing agent (Irgacure 2959) and UV photopolymerization was performed at a wavelength of 395/405 nm to synthesize 5 types of ChCl-AA-PEDOT:PSS elastomer samples having different PEDOT:PSS compositions. These elastomers correspond to Embodiments 1 to 5 indicated as ChCl-AA-PEDOT:PSS in Table 1. Embodiment 11 was further added with 1 mol % of phytic acid (PA) with respect to acrylic acid (AA) compared to Embodiment 3 and has the same PEDOT:

PSS composition as Embodiment 3. The synthesized elastomers were dipped in 95% sulfuric acid ($H_2SO_4$) for 10 minutes to transform some $PSS^-$ chains to PSSH chains (see the reaction formula below). Thereafter, the sulfuric acid-treated samples were sufficiently washed using deionized water (DI) and dried on a 130° C. hot plate for 10 minutes to synthesize sulfuric acid-treated ChCl-AA-PEDOT:PSS elastomers. These elastomers correspond to Embodiments 6 to 10 indicated as H-ChCl-AA-PEDOT:PSS in Table 1. Meanwhile, in Embodiment 12, the sample of Embodiment 11 was treated with sulfuric acid in the same manner as above.

$$H_2SO_4 + PSS^- \rightarrow HSO_4^- + PSSH$$

a range of 1200 $cm^{-1}$ to 1600 $cm^{-1}$. In FIG. 4A, a peak of 1263 $cm^{-1}$ is due to stretching vibration of $C_\alpha$-$C_\alpha$ bonds in thiophene rings of PEDOT, a peak of 1367 $cm^{-1}$ is due to $C_\beta$-$C_\beta$ bonds of PEDOT, a peak of 1445 $cm^{-1}$ is due to PEDOT symmetric $C_\alpha$-$C_\beta$ bonds, and a peak of 1506 $cm^{-1}$ is due to asymmetric $C_\alpha$=$C_\beta$ bonds.

Referring to FIG. 4A, before sulfuric acid treatment, the peak of PEDOT symmetric $C_\alpha$=$C_\beta$ bonds is observed at 1445 $cm^{-1}$, which represents a benzoid structure of PEDOT. However, after sulfuric acid treatment, the peak is shifted from 1445 $cm^{-1}$ to 1427 $cm^{-1}$, which means that the symmetric $C_\alpha$=$C_\beta$ bonds of PEDOT are transited from the benzoid structure to a quinoid structure. As described above in relation to FIG. 1B, it may be regarded that some of PSS is removed from the PEDOT:PSS nanoparticles dispersed in or on the surface of the ChCl-AA matrix constituting the elastomer sample, thereby transforming a coil structure to a linear structure.

TABLE 1

| Sample No. | Sample Type | ChCl-AA (molar ratio) | PEDOT:PSS (wt %) | Conductivity (S/m) |
|---|---|---|---|---|
| Comparative Example | ChCl-AA | 1:2 | 0 | 0.13 |
| Embodiment 1 | ChCl-AA-PEDOT:PSS | 1:2 | 1.4 | 0.23 |
| Embodiment 2 | ChCl-AA-PEDOT:PSS | 1:2 | 2.76 | 0.54 |
| Embodiment 3 | ChCl-AA-PEDOT:PSS | 1:2 | 4.08 | 0.94 |
| Embodiment 4 | ChCl-AA-PEDOT:PSS | 1:2 | 5.37 | 0.94 |
| Embodiment 5 | ChCl-AA-PEDOT:PSS | 1:2 | 6.62 | 0.94 |
| Embodiment 6 | H-ChCl-AA-PEDOT:PSS | 1:2 | 1.4 | 8.26 |
| Embodiment 7 | H-ChCl-AA-PEDOT:PSS | 1:2 | 2.76 | 9.26 |
| Embodiment 8 | H-ChCl-AA-PEDOT:PSS | 1:2 | 4.08 | 13.14 |
| Embodiment 9 | H-ChCl-AA-PEDOT:PSS | 1:2 | 5.37 | 13.06 |
| Embodiment 10 | H-ChCl-AA-PEDOT:PSS | 1:2 | 6.62 | 12.96 |
| Embodiment 11 | ChCl-AA-PA-PEDOT:PSS(PA/AA 1 mol %) | 1:2 | 4.08 | 0.63 |
| Embodiment 12 | H-ChCl-AA-PA-PEDOT:PSS(PA/AA 1 mol %) | 1:2 | 4.08 | 7.16 |

Figure 2A:
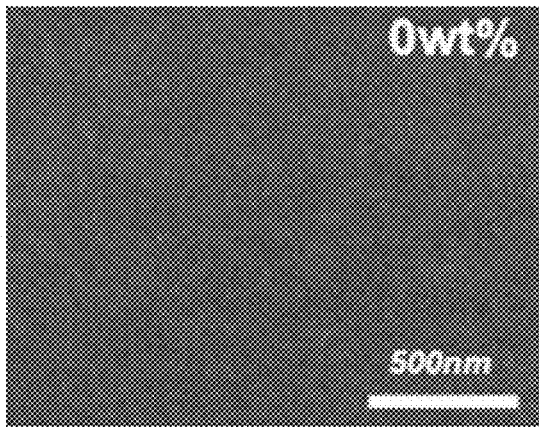
FIG. 2A, FIG. 2B, and FIG. 2C are scanning electron microscope (SEM) images of embodiments of the present invention and a comparative example.
Figure 2B:
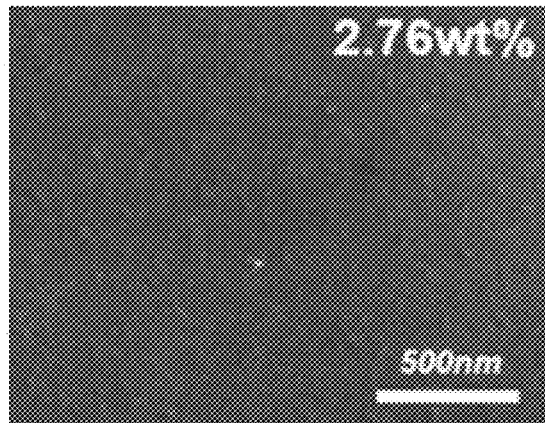
Figure 2C:
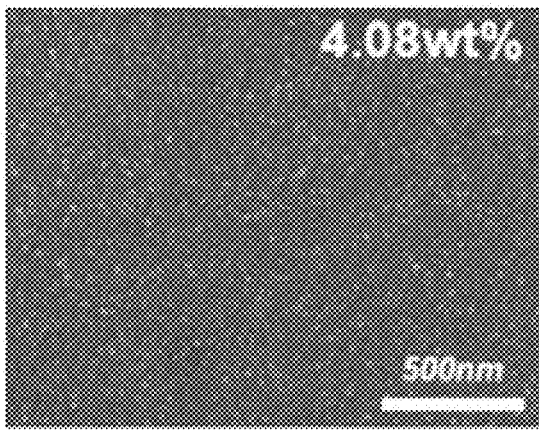

FIG. 2A, FIG. 2B, and FIG. 2C are scanning electron microscope (SEM) images of the samples corresponding to Comparative Example and Embodiments 2 and 3. When FIG. 2A, FIG. 2B, and FIG. 2C are compared, the samples added with PEDOT:PSS on the surface exhibit PSS-rich regions in white color.

Figure 3A:
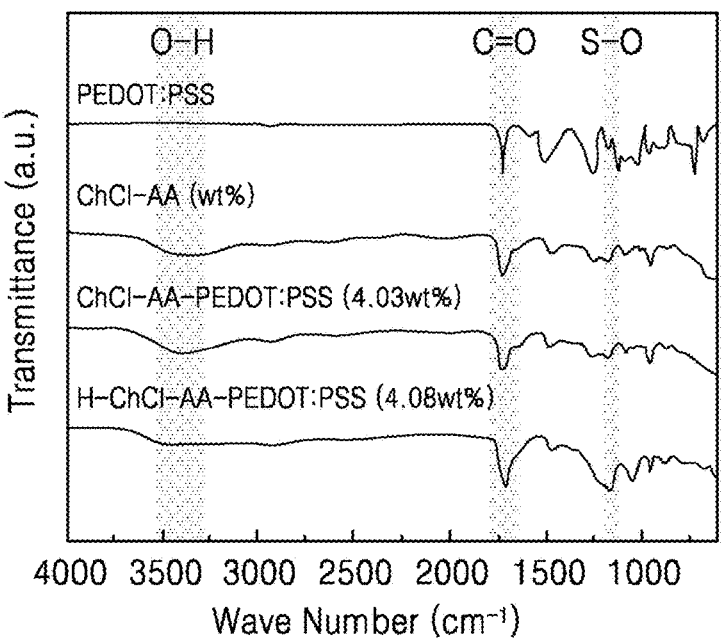
FIG. 3A and FIG. 3B show Fourier-transform infrared spectroscopy (FT-IR) and X-ray photoelectron spectroscopy (XPS) analysis results of embodiments of the present invention.
Figure 3B:
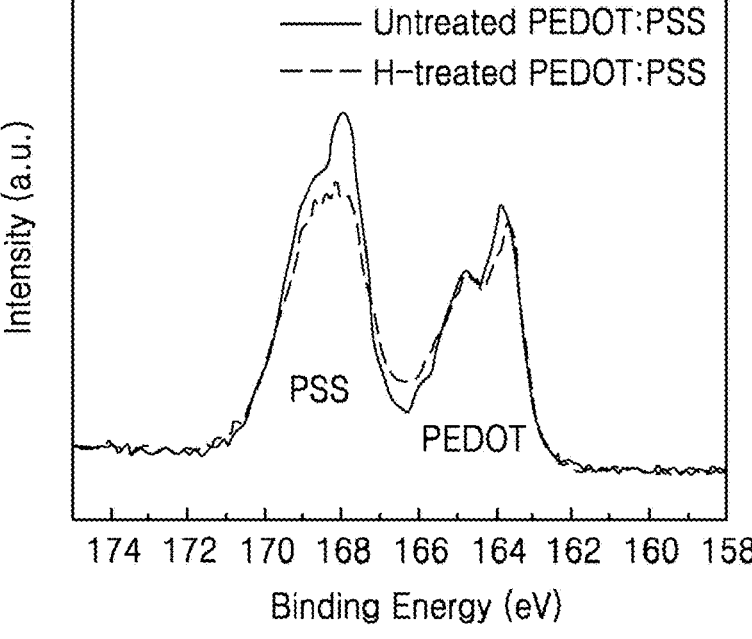

FIG. 3A and FIG. 3B show Fourier-transform infrared spectroscopy (FT-IR) and X-ray photoelectron spectroscopy (XPS) analysis results of Embodiments 3 and 8 in which the content of PEDOT:PSS is 4.08 wt %.

FIG. 3A shows the FT-IR results together with the FT-IR results of PEDOT:PSS and Comparative Example. Referring to FIG. 3A, Comparative Example and Embodiments 3 and 8 exhibit a peak at 3200 $cm^{-1}$ to 3500 $cm^{-1}$, and PEDOT:PSS exhibits no peak. The peak is an OH functional group and represents hydrogen bonds in the samples corresponding to Comparative Example and Embodiments 3 and 8. It is shown that this result is due to ChCl-AA.

In FIG. 3B, H-treated PEDOT:PSS corresponds to Embodiment 8, and untreated PEDOT:PSS corresponds to Embodiment 3. Referring to FIG. 3B, the result of analyzing a $2p$ spectrum of sulfur (S) after sulfuric acid ($H_2SO_4$) treatment shows a change in peak shape due to sulfur treatment, which means that the structure is changed because some of PSS is removed from the PEDOT:PSS nanoparticles dispersed in or on the surface of the ChCl-AA matrix constituting the elastomer sample.

Figure 4B:
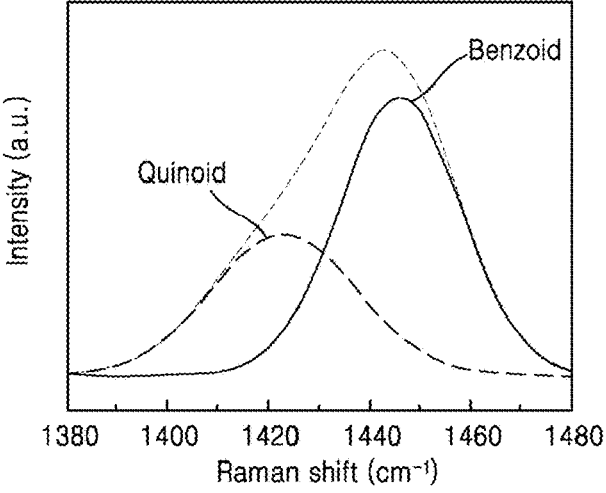
Figure 4C:
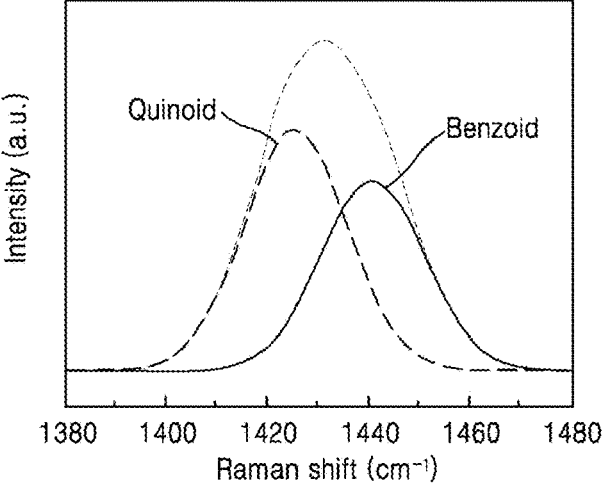

FIG. 4A, FIG. 4B, and FIG. 4C show Raman analysis results of Embodiments 3 and 8. FIG. 4A shows a result in FIG. 4B shows a Raman analysis result in a range of 1380 $cm^{-1}$ to 1480 $cm^{-1}$ before sulfuric acid treatment (i.e., Embodiment 3), and it is shown that a benzoid structure is included more than a quinoid structure before sulfuric acid treatment. It means that PEDOT:PSS has a coil structure. FIG. 4C shows a Raman analysis result in a range of 1380 $cm^{-1}$ to 1480 $cm^{-1}$ after sulfuric acid treatment (i.e., Embodiment 8), and it is shown that a quinoid structure is included more than a benzoid structure. It means that PEDOT:PSS has a linear structure.

Figure 5A:
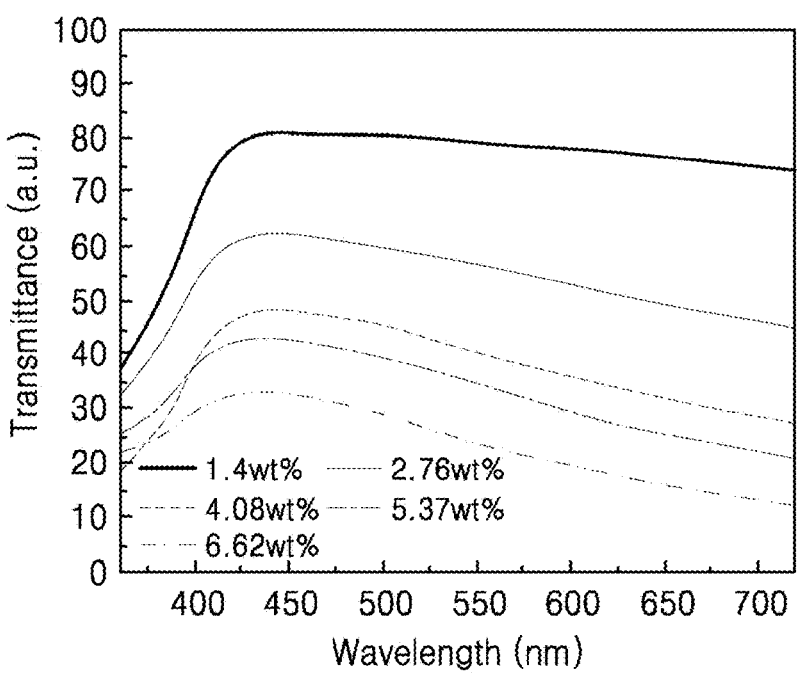
FIG. 5A and FIG. 5B show transmittance analysis results of embodiments of the present invention and a comparative example.
Figure 5B:
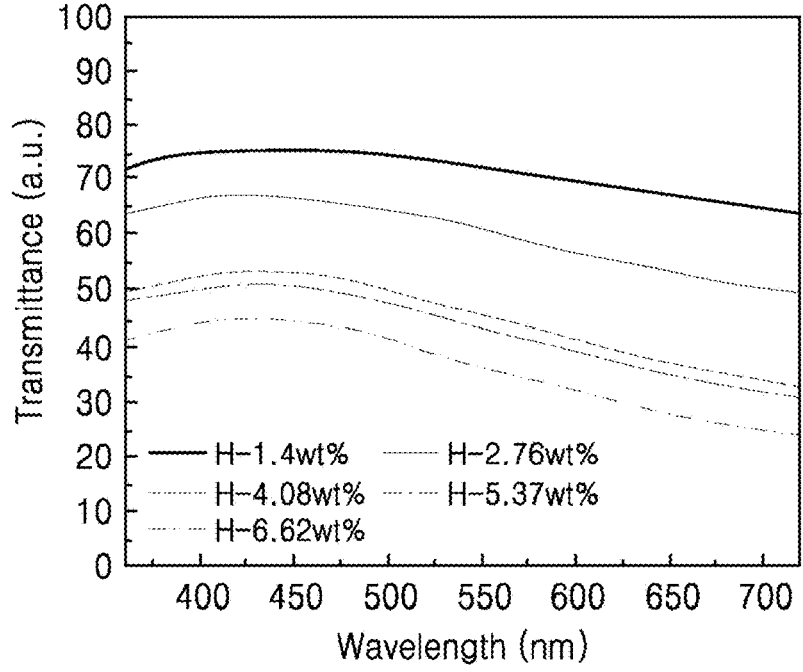

FIG. 5A is a graph showing transmittances of Comparative Example and Embodiments 1 to 5, and FIG. 5B is a graph showing transmittances of Embodiments 6 to 10. Referring to FIG. 5A and FIG. 5B, it is shown that Embodiments 6 to 10 treated with sulfuric acid exhibit higher transmittances compared to Embodiments 1 to 5 having the same PEDOT:PSS compositions. It may be resulted that transmittance properties of the ChCl-AA-PEDOT:PSS elastomer are improved due to sulfuric acid treatment.

Table 1 shows electrical conductivities of the comparative example and the embodiments. Referring to Table 1, it is shown that Embodiments 6 to 10 treated with sulfuric acid have higher electrical conductivities compared to Embodiments 1 to 5 having the same PEDOT:PSS compositions.

Figure 6A:
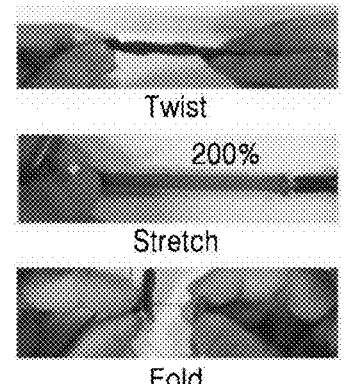
FIG. 6A, FIG. 6B, and FIG. 6C show electrical properties of an embodiment produced in various shapes.
Figure 6B:
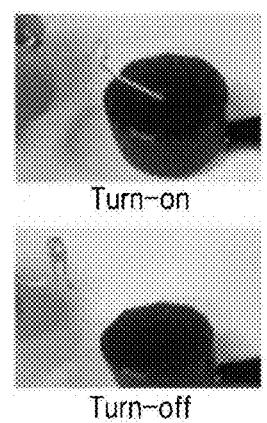
Figure 6C:
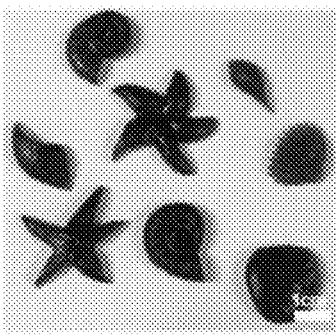

FIG. 6A, FIG. 6B, and FIG. 6C show electrical properties of an embodiment produced in various shapes. FIG. 6A shows that Embodiment 3 turns on a red light-emitting diode (LED) even when twisted, stretched, or folded, which means that the elastomer according to the current embodiment maintains a high electrical conductivity in spite of deformation. FIG. 6B shows, based on a red LED, ON/OFF states of Embodiment 3 produced in a compressed form. FIG. 6C shows an example in which the elastomer of Embodiment 3 is producible in various shapes by using silicone molds.

Table 2 shows mechanical properties of the comparative example and the embodiments.

TABLE 2

| Sample No. (thickness) | PEDOT:PSS (wt %) | Tensile Strength (kPa) | Elongation (%) | Young's Modulus (kPa) |
|---|---|---|---|---|
| Comparative Example (1 mm) | 0 | 247 | 711 | 22.6 |
| Embodiment 1 (1 mm) | 1.4 | 223 | 494 | 175.8 |
| Embodiment 2 (1 mm) | 2.76 | 234 | 543 | 168.7 |
| Embodiment 3 (1 mm) | 4.08 | 307 | 802 | 144 |
| Embodiment 4 (1 mm) | 5.37 | 244 | 703 | 155.6 |
| Embodiment 5 (1 mm) | 6.62 | 245 | 627 | 180.7 |
| Embodiment 6 (1 mm) | 1.4 | 295 | 448 | 173.2 |
| Embodiment 7 (1 mm) | 2.76 | 370 | 629 | 197.4 |
| Embodiment 8 (1 mm) | 4.08 | 445 | 964 | 238.8 |
| Embodiment 9 (1 mm) | 5.37 | 557 | 835 | 221.3 |
| Embodiment 10 (1 mm) | 6.62 | 408 | 733 | 274.5 |
| Embodiment 11 (1 mm) | 4.08 | 365 | 846 | 110 |
| Embodiment 12 (1 mm) | 4.08 | 410 | 1175 | 125 |
| Comparative Example (0.5 mm) | 0 | 372 | 774 | 190 |
| Embodiment 3 (0.5 mm) | 4.08 | 448 | 836 | 208.1 |
| Embodiment 8 (0.5 mm) | 4.08 | 508 | 991 | 156 |

Referring to Table 2, it is shown that Embodiments 6 to 10 and 12 treated with sulfuric acid exhibit higher tensile strengths, elongations, and Young's moduli compared to Embodiments 1 to 5 and 11 having the same PEDOT:PSS compositions. It may be resulted that mechanical properties of the ChCl-AA-PEDOT:PSS elastomer are improved due to sulfuric acid treatment.

Meanwhile, Embodiment 12 added with phytic acid (PA) exhibits a higher elongation than Embodiment 8 because choline chloride and phytic acid are strongly cross-linked through hydrogen bonds (OH—O(PO(OH)$_2$).

Figure 7A:
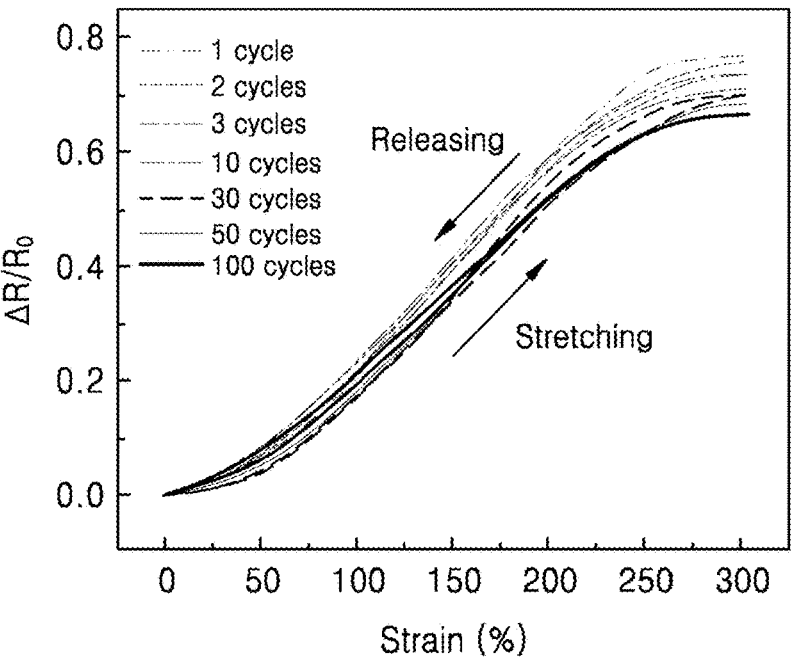
FIG. 7A and FIG. 7B show hysteresis loops obtained by measuring changes in resistance of embodiments of the present invention based on a repeated load.
Figure 7B:
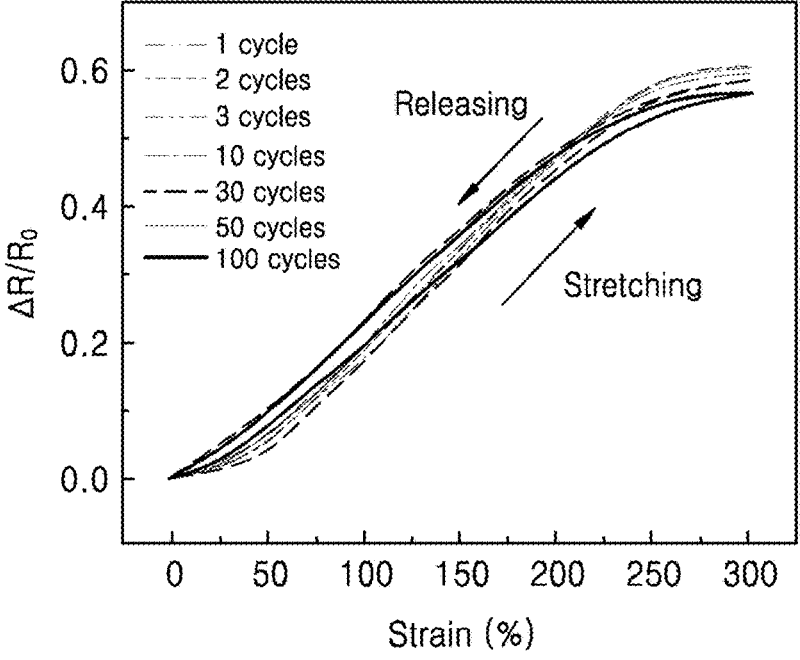

FIG. 7A and FIG. 7B show hysteresis loops obtained by measuring changes in resistance when the samples corresponding to Embodiments 3 and 8 are repeatedly stretched and released. Referring to FIG. 7A, when a repeated test is performed on Embodiment 3, the change in resistance to stress is slightly reduced. However, as shown in FIG. 7B, when the repeated test is equally performed three times on Embodiment 8, the resistance is maintained without being reduced. It may be resulted that durability of the ChCl-AA-PEDOT:PSS elastomer against a repeated load is increased due to sulfuric acid treatment.

Table 3 shows response signals and response times of Embodiments 3 and 8 based on a stretch speed when an elongation is 150%.

TABLE 3

| Sample No. | 10 No./ min (ms) | 60 No./ min (ms) | 260 No./ min (ms) | Remarks |
|---|---|---|---|---|
| Comparative Example | 2013 | 417 | 97 | Unstable waveform |
| Embodiment 3 | 2009 | 415 | 88 | Normal waveform |
| Embodiment 8 | 1874 | 416 | 84 | Normal waveform |
| Embodiment 11 | 2429 | 486 | 109 | Normal waveform |
| Embodiment 12 | 2082 | 416 | 94 | Normal waveform |

Referring to Table 3, Embodiments 3 and 8 exhibit response times of 2009 ms and 1874 ms at a speed of 10 No./min (repeating stretch and release 10 times per minute), exhibit response times of 415 ms and 416 ms at a speed of 60 No./min, and exhibit response times of 88 ms and 84 ms at a speed of 260 No./min, respectively, which means they exhibit shorter response times at a faster speed of repeating stretch and release. Embodiments 11 and 12 exhibit response times of 2429 ms and 2082 ms at a speed of 10 No./min (repeating stretch and release 10 times per minute), exhibit response times of 486 ms and 416 ms at a speed of 60 No./min, and exhibit response times of 109 ms and 94 ms at a speed of 260 No./min, respectively, which means they exhibit short response times. In Comparative Example, unstable signals are detected due to changes in waveform at a fast speed.

Response signals of Comparative Example and Embodiments 3 and 8 when folded are measured. Fully-folded operation signals of the samples are detected for measurement. The result of measurement shows that response signals of Comparative Example and Embodiments 3 and 8 are detected at 336 ms, 44 ms, and 26 ms, respectively, which means that Embodiment 8 exhibits the shortest response time.

Figure 8A:
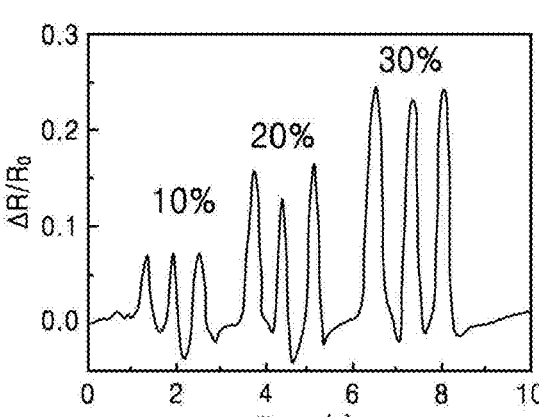
FIG. 8A, FIG. 8B, FIG. 8C, FIG. 8D, FIG. 8E, and FIG. 8F are graphs showing signals detected by embodiments of the present invention and a comparative example in compressed states, and response times measured based on the detected signals.
Figure 8B:
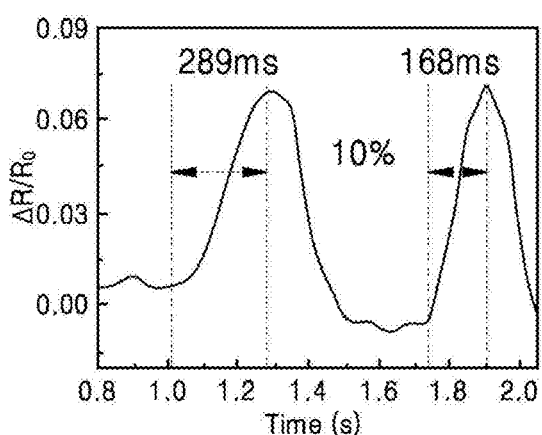
Figure 8C:
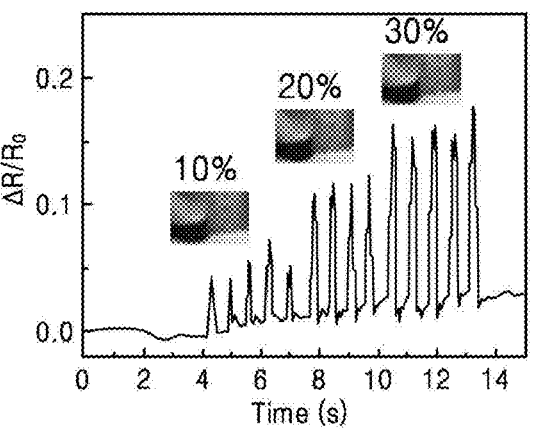
Figure 8D:
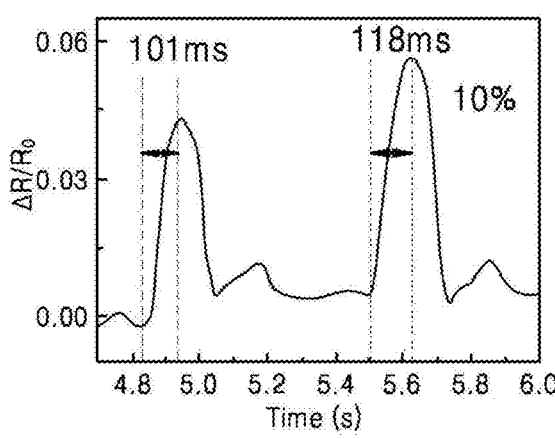
Figure 8E:
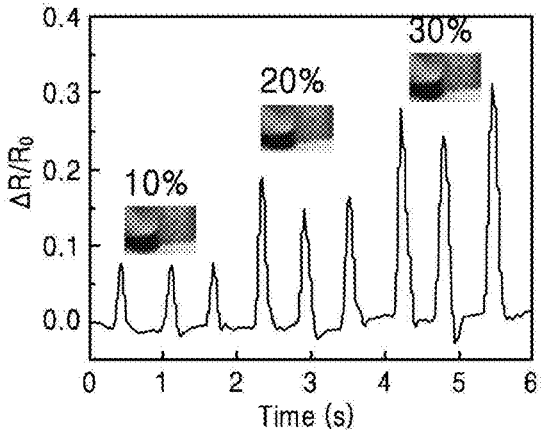
Figure 8F:
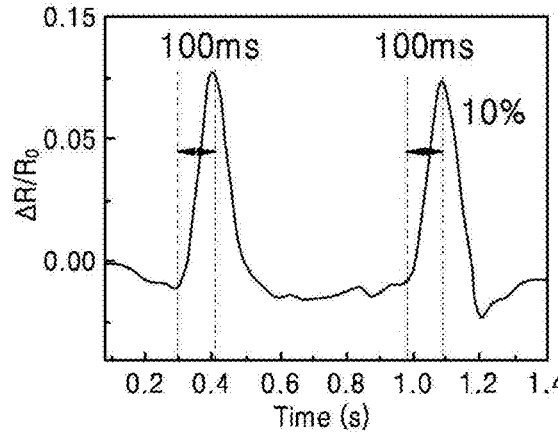

FIG. 8A, FIG. 8B, FIG. 8C, FIG. 8D, FIG. 8E, and FIG. 8F are graphs showing signals detected by Comparative Example and Embodiments 3 and 8 in 10% to 30% compressed states, and response times calculated based on the detected signals. FIG. 8A and FIG. 8B show the result of Comparative Example which exhibits the shortest response time of 168 ms at a compression rate of 10%. FIG. 8C and FIG. 8D show the result of Embodiment 3 which exhibits the shortest response time of 101 ms at a compression rate of 10%. FIG. 8E and FIG. 8F show the result of Embodiment 8 which exhibits the shortest response time of 100 ms at a compression rate of 10%, which is the best result.

Figure 9:
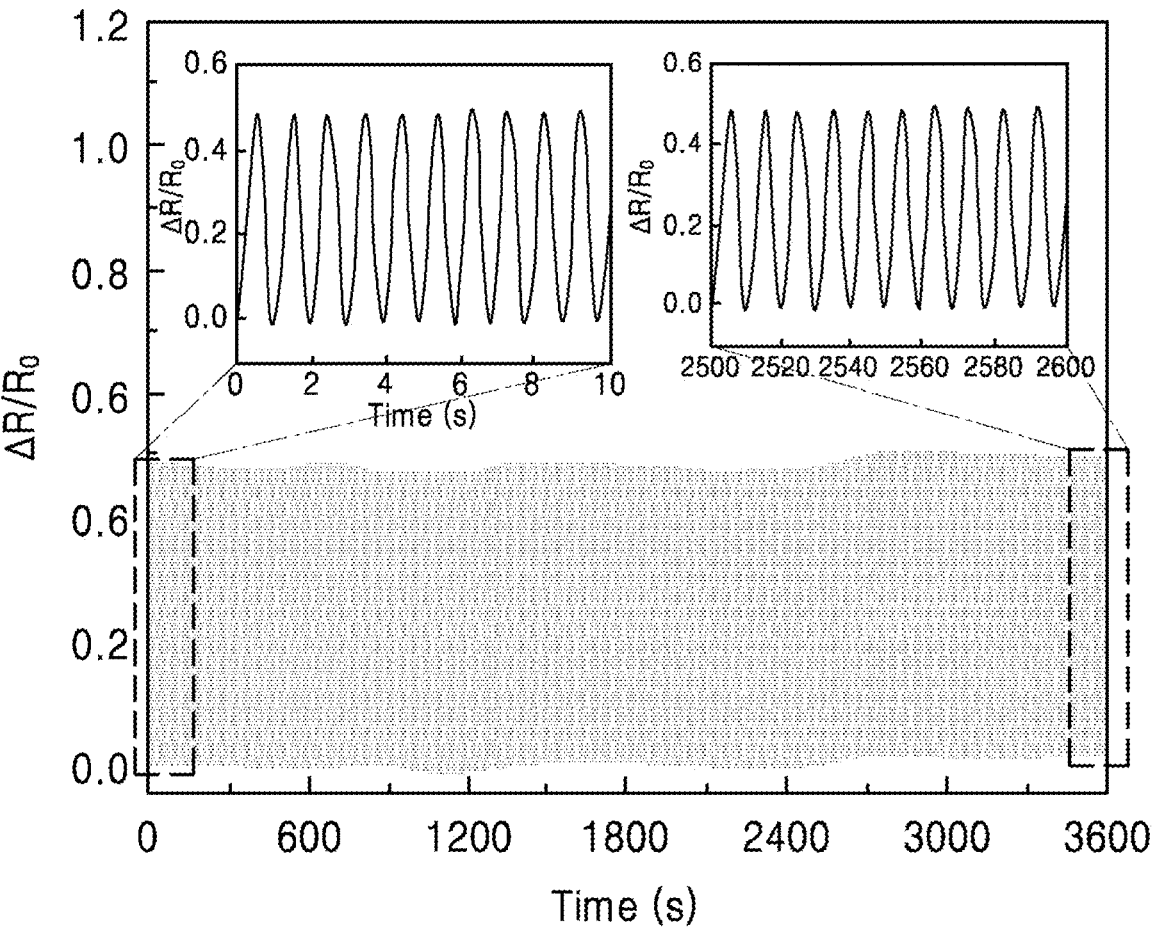
FIG. 9 shows a result of performing a repeated test on an embodiment of the present invention at a strain of 50% for 1 hour.

FIG. 9 shows a result of performing a repeated test on the sample corresponding to Embodiment 8 at a strain of 50% for 1 hour. Compared to before the test, no change in resistance is shown after the 1-hour test.

Table 4 shows durability test results of Embodiments 3 and 8 based on thickness and strain, and the number of cycles repeated at a speed of 60 No./min until a change in resistance occurs in the sample is measured.

TABLE 4

| Sample No. | Durability (# of cycles) (50% strain) | Durability (# of cycles) (100% strain) | Durability (# of cycles) (150% strain) |
|---|---|---|---|
| Embodiment 3 (1 mm) | 11,300 | 4,450 | 2,150 |
| Embodiment 8 (1 mm) | 23,000 | 12,100 | 5,350 |
| Embodiment 3 (0.5 mm) | 8,850 | 3,650 | 1,600 |
| Embodiment 8 (0.5 mm) | 22,200 | 13,700 | 3,100 |

Referring to Table 4, Embodiment 3 exhibits no change in resistance until 2,150cycles at a strain of 150%, exhibits no change in resistance until 4,450 cycles at a strain of 100%, and exhibits no change in resistance until 11,300 cycles at a strain of 50%. Meanwhile, Embodiment 8 exhibits no change in resistance until 5,350 cycles at a strain of 150%, exhibits no change in resistance until 12,100 cycles at a strain of 100%, and exhibits no change in resistance until 23,000 cycles at a strain of 50%. When Embodiments 3 and 8 are compared, Embodiment 8 exhibits a higher durability.

TABLE 5

| Sample No. | 0 h | 12 h | 24 h | Remarks |
|---|---|---|---|---|
| Embodiment 8 (1 mm) (50% strain) | 486 ms | 416 ms | 416 ms | Recovered after 12 hours |
| Embodiment 8 (1 mm) (100% strain) | 486 ms | 416 ms | 416 ms | Recovered after 12 hours |

Referring to Table 5, a response time is measured after durability tests (60k cycles) of Embodiment 8 and it is shown that, at a strain of 50%, compared to before the test (416 ms), the response time is delayed by 70 ms immediately after the test (0h; 486 ms), is the same after 12-hour recovery, and is also the same after 24-hour recovery, which means that the sample is self-healed after 12 hours. Likewise, it is also shown that, at a strain of 100%, compared to before the test (416 ms), the response time is delayed by 70 ms immediately after 60k cycles (0h; 486 ms) and is the same from 12-hour recovery.

FIG. 10A, FIG. 10B, FIG. 10C, FIG. 10D, FIG. 10E, and FIG. 10F are graphs showing a 60k repeated-fatigue test and recovery from fatigue at a strain of 100% (60 No./min). FIG. 10A shows a repeated-fatigue test corresponding to Embodiment 3. FIG. 10B shows a repeated-fatigue test corresponding to Embodiment 8. FIG. 10C shows a result after 12 hours from the 60k repeated-fatigue test of FIG. 10B at a strain of 100%, and it is shown that a response time before the 60k test (1 cycle) and a response time after 12 hours from the 60k test (60k cycles) are equally 416 ms.

FIG. 10D corresponds to Embodiment 8 and shows a self-healing test after a 60k repeated-fatigue test at a strain of 50%. It is shown that a strain before the test is 964%, a strain immediately after the test (0h) is 912%, and strains after 12 hours and 24 hours are 943% and 953%, respectively, which means that the sample is gradually recovered. FIG. 10E corresponds to Embodiment 8 and shows a self-healing test after a 60k repeated-fatigue test at a strain of 100%. It is shown that a strain before the test is 964%, a strain immediately after the test (0h) is 896%, and strains after 12 hours and 24 hours are 914% and 959%, respectively, which means that the sample is gradually recovered. FIG. 10F shows changes in resistance measured when Embodiment 8 is cut and then attached again. It means that ChCl-AA-PEDOT:PSS synthesized according to the present invention is recovered over time.

FIG. 11A, FIG. 11B, FIG. 11C, FIG. 11D, FIG. 11E, and FIG. 11F show results of detecting signals corresponding to physiological body motions by a biosensor manufactured using the sample corresponding to Embodiment 3. FIG. 11A shows a result of measuring a body motion of folding an arm by the sensor attached to an elbow. FIG. 11B shows different changes in resistance measured by the sensor attached to an index finger based on an angle at which the index finger is bent. FIG. 11C shows a result of detecting a signal by the sensor attached to a knee when the knee is straitened or bent. FIG. 11D shows a result of detecting different signals by the sensor attached to the neck when a user utters "Hello", "How are you?", and "Good". FIG. 11E shows a result of detecting a signal by the sensor attached to the neck in the same manner as FIG. 11D when a user drinks water. FIG. 11F shows a result of detecting a signal by the sensor attached to the neck in the same manner as FIG. 11D when a user shouts "Ah" in loud voice. It is shown that unique signals are detected based on the body motions.

Figure 12A:
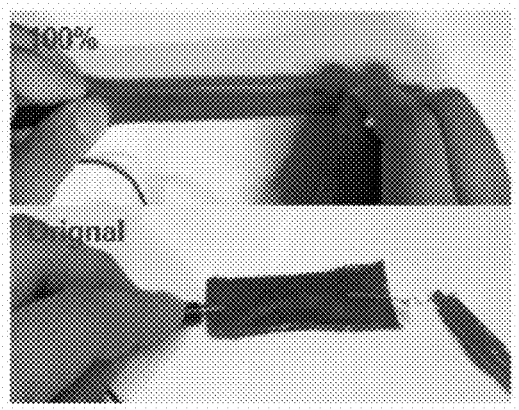
FIG. 12A, FIG. 12B, and FIG. 12C show conductivity and response times of a sample manufactured by deep-coating latex with an elastomer according to an embodiment of the present invention.
Figure 12B:
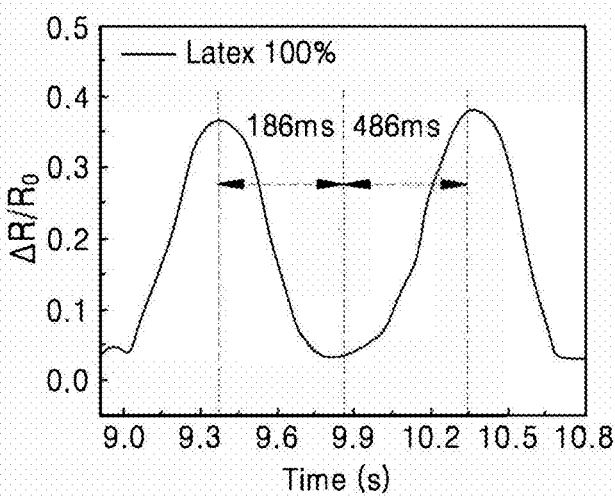
Figure 12C:
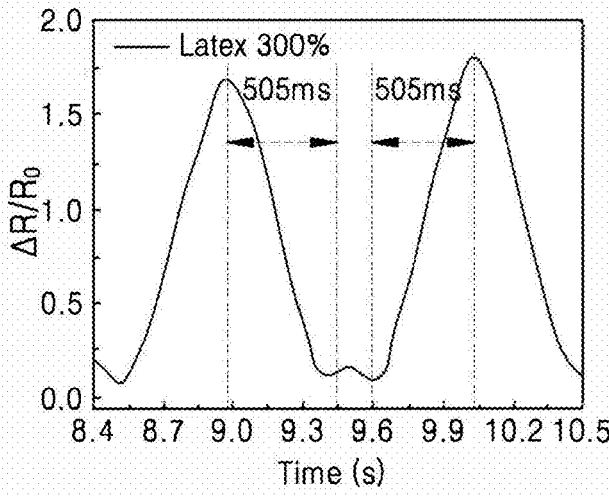

FIG. 12A, FIG. 12B, and FIG. 12C show conductivity and response times of a sample manufactured by deep-coating latex with the elastomer according to Embodiment 3 of the present invention.

FIG. 12A shows whether the latex coated with Embodiment 3 and then stretched has electrical conductivity, and it is shown that electricity flows through the coated and then 100% stretched latex to turn on a red LED. FIG. 12B shows that the latex coated and stretched at a strain of 100% exhibits a response time of 486 ms. FIG. 12C shows that the latex coated and stretched in the same manner as FIG. 12B at a strain of strain 300% exhibits a response time of 505 ms.

Figure 13A:
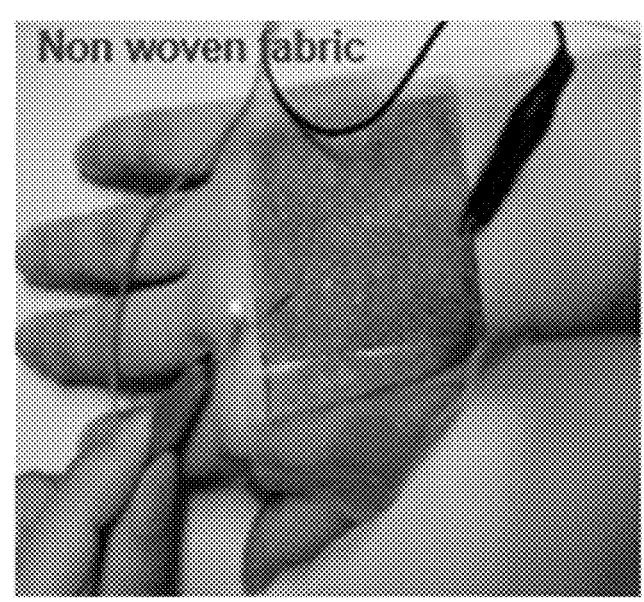
FIG. 13A and FIG. 13B show a result of detecting a signal by a sample manufactured by deep-coating non-woven fabric with an elastomer according to an embodiment of the present invention.
Figure 13B:
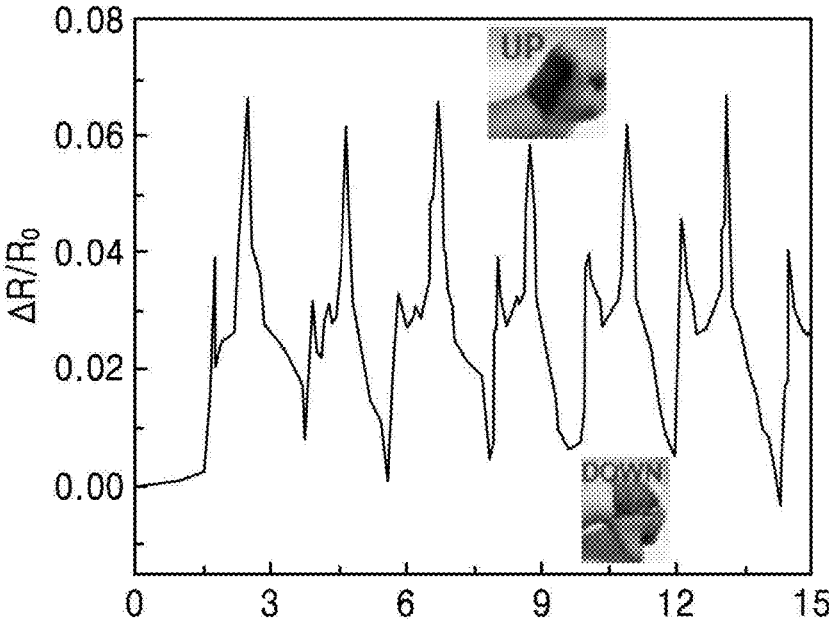

FIG. 13A and FIG. 13B show a result of detecting a signal by a sample manufactured by deep-coating non-woven fabric with the elastomer according to Embodiment 3 of the present invention.

FIG. 13A shows whether the coated non-woven fabric has electrical conductivity. FIG. 13B shows a result of detecting a signal by the coated non-woven fabric based on hand motions, and it is shown that the signal corresponding to the hand motions is detected.

Figure 14A:
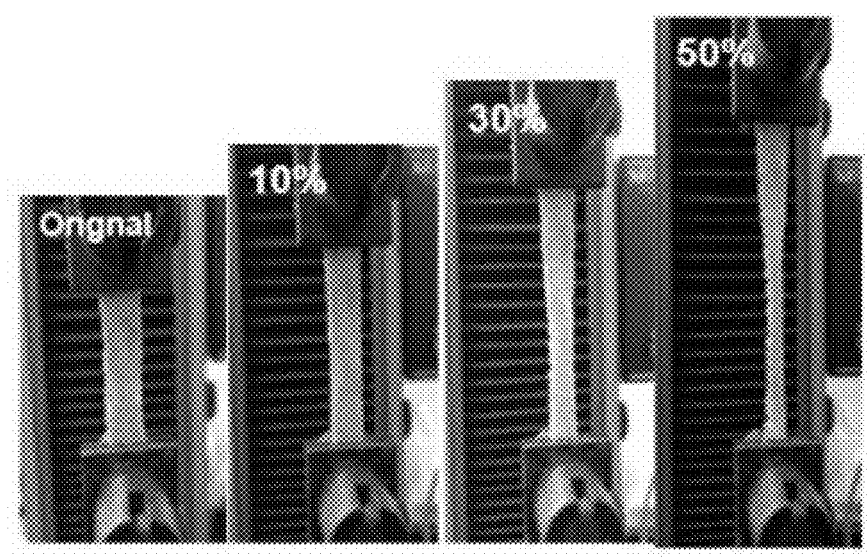
FIG. 14A and FIG. 14B show a result of detecting a signal by a sample manufactured by deep-coating woven fabric with an elastomer according to an embodiment of the present invention.
Figure 14B:
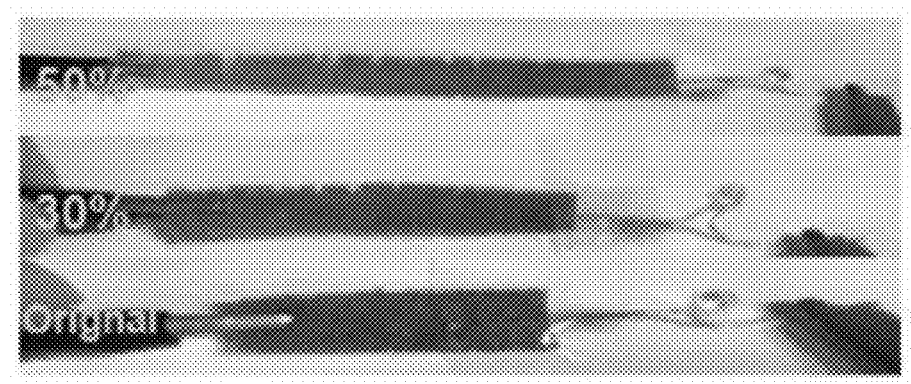

FIG. 14A and FIG. 14B show a result of detecting a signal by a sample manufactured by deep-coating woven fabric with the elastomer according to Embodiment 3 of the present invention. FIG. 14A shows shapes in which the coated woven fabric is stretched up to 50% by using a universal testing machine (UTM). FIG. 14B shows whether the coated woven fabric has electrical conductivity even after being stretched, and it is shown that a red LED is turned on even after the coated woven fabric is stretched up to 50%.

Figure 15A:
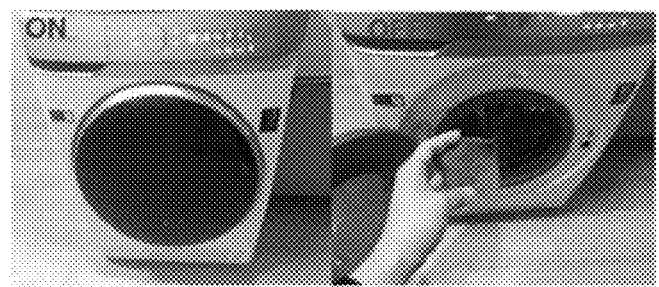
FIG. 15A, FIG. 15B, and FIG. 15C show results of detecting electrical signals after woven fabric is coated with an elastomer according to an embodiment of the present invention and then washed in a washing machine.
Figure 15B:
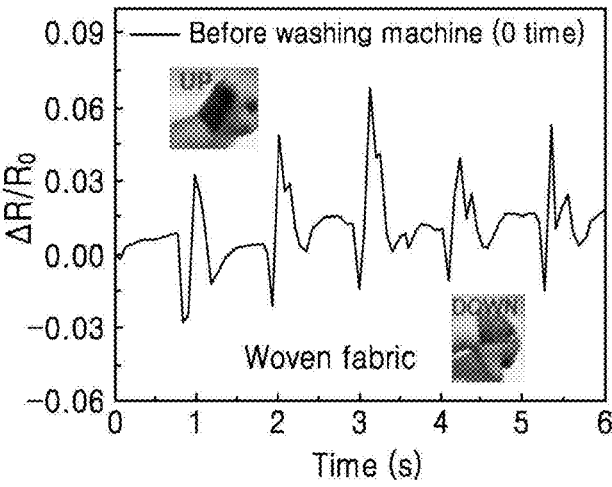
Figure 15C:
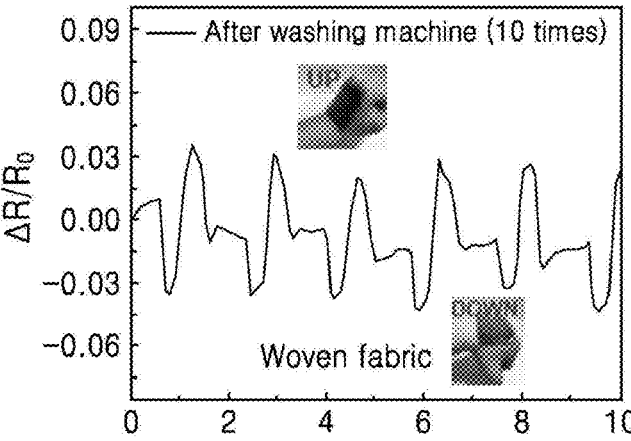

FIG. 15A, FIG. 15B, and FIG. 15C show results of detecting electrical signals after woven fabric is coated with the elastomer according to Embodiment 3 of the present invention and then washed in a washing machine.

FIG. 15A shows that the coated woven fabric is washed in the washing machine. FIG. 15B shows a signal detected by the coated woven fabric before being washed. FIG. 15C shows a signal detected by the coated woven fabric after being washed 10 times. It is shown that, even after washing the coated sample 10 times, a signal corresponding to hand motions is detected as before washing. It means that a wearable device manufactured using the ChCl-AA-PEDOT: PSS elastomer according to an embodiment of the present invention has a high durability.

As described above, a biosensor manufactured using a conductive elastomer synthesized according to an embodiment of the present invention may rapidly and stably detect signals and have high durability and stretchability. In addition, a body-attached sensor, which mimics various human skin functions due to its light weight, flexibility, and wearability, may be eco-environmentally, economically, and efficiently manufactured.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A method of synthesizing an electrically conductive elastomer, the method comprising:
   (a) preparing a eutectic solvent by mixing and causing reaction between quaternary ammonium salt and organic acid; and
   (b) adding and blending the eutectic solvent with poly (3,4-ethylenedioxythiophene) polystyrene sulfonate (PEDOT:PSS), a photocuring agent, and a crosslinker and then performing photopolymerization, wherein the polymerization of (b) prepares a polymer in which PEDOT:PSS nanoparticles have a coil-shaped benzoid structure; and transforming the coil-shaped benzoid structure of at least a portion of the PEDOT:PSS nanoparticles into a linear quinoid structure, wherein the photocuring agent and the crosslinker are blended in a molar ratio of 0.1 to 0.3 of the organic acid in step (b).

2. The method of claim 1, further comprising performing sulfuric acid treatment on the elastomer synthesized in step (b) to transform the coil-shaped benzoid structure of at least a portion of the PEDOT:PSS nanoparticles into the linear quinoid structure.

3. The method of claim 1, wherein the quaternary ammonium salt and the organic acid are mixed in a molar ratio of 1:1 to 1:3.

4. The method of claim 1, further comprising adding 0.5 mol % to 2 mol % of phytic acid with respect to the organic acid.

5. The method of claim 1, wherein the quaternary ammonium salt comprises choline chloride, tetramethylammonium, acetylcholine, benzalkonium chloride, or cetrimonium chloride.

6. The method of claim 1, wherein the organic acid comprises any one selected from the group consisting of urea, thiourea, 1-methyl urea, 1,3-dimethyl urea, 1,1-dimethyl urea, acetamide, benzamide, ethylene glycol, glycerol, adipic acid, acrylic acid, benzoic acid, citric acid, malonic acid, oxalic acid, phenylacetic acid, phenylpropionic acid, succinic acid, lactic acid, and tricarboxylic acid.

7. The method of claim 1, wherein a content of PEDOT: PSS ranges from 0.5 wt % to 10 wt % with respect to a total mass of PEDOT:PSS and the eutectic solvent in step (b).

8. An electrically conductive elastomer prepared by the method of claim 1 in which poly (3,4-ethylenedioxythiophene) polystyrene sulfonate (PEDOT:PSS) nanoparticles are dispersed in an ionic conductor matrix formed from a eutectic solvent prepared by causing reaction between quaternary ammonium salt and organic acid, wherein PEDOT: PSS comprises a linear quinoid structure from which some of PSS is removed.

9. The electrically conductive elastomer of claim 8, wherein the ionic conductor is formed from a eutectic solvent prepared by mixing choline chloride and acrylic acid.

10. A biosensor comprising the electrically conductive elastomer of claim 8.

* * * * *